(12) United States Patent  (10) Patent No.: US 7,772,733 B2
Chen  (45) Date of Patent: Aug. 10, 2010

(54) FLAT ELECTRICAL GENERATOR

(76) Inventor: Chuan-Sheng Chen, Fl. 12 No. 137, Sec. 4, JenAi Rd., Taipei (TW)

( * ) Notice: Subject to any disclaimer, the term of this patent is extended or adjusted under 35 U.S.C. 154(b) by 108 days.

(21) Appl. No.: 11/834,015

(22) Filed: Aug. 6, 2007

(65) Prior Publication Data

US 2008/0278014 A1  Nov. 13, 2008

(30) Foreign Application Priority Data

Jul. 5, 2007  (TW) .............................. 96124401 A

(51) Int. Cl.
*H02K 16/00* (2006.01)
*H02K 16/02* (2006.01)

(52) U.S. Cl. ..................... 310/114; 310/67 R; 310/239; 310/268; 310/156.23; 310/156.82; 310/43; 310/248; 310/237; 310/247

(58) Field of Classification Search ............... 310/67 R, 310/114, 154.01, 156.32; *H02K 16/00, 16/02*
See application file for complete search history.

(56) References Cited

U.S. PATENT DOCUMENTS

| | | | | |
|---|---|---|---|---|
| 1,492,857 | A * | 5/1924 | Morse ..................... | 200/19.08 |
| 2,415,634 | A * | 2/1947 | Hill ............................ | 310/237 |
| 3,525,008 | A * | 8/1970 | Burr ........................... | 310/268 |
| 4,188,556 | A * | 2/1980 | Hahn ......................... | 310/268 |
| 4,600,850 | A * | 7/1986 | Mazzorana et al. ......... | 310/242 |
| 4,743,813 | A * | 5/1988 | Tassinario ............. | 318/400.09 |
| 4,987,333 | A * | 1/1991 | Noguchi et al. ............. | 310/268 |
| 5,514,923 | A * | 5/1996 | Gossler et al. ................ | 310/74 |
| 6,794,783 | B2 * | 9/2004 | Tu et al. ................. | 310/156.32 |
| 2005/0035681 | A1* | 2/2005 | Faltin ......................... | 310/268 |
| 2005/0035861 | A1* | 2/2005 | Gliessmann et al. ...... | 340/572.1 |
| 2006/0038456 | A1* | 2/2006 | Bojiuc ................... | 310/156.32 |
| 2007/0069600 | A1* | 3/2007 | Hiramatsu ............. | 310/156.32 |

* cited by examiner

*Primary Examiner*—Quyen Leung
*Assistant Examiner*—John K Kim
(74) *Attorney, Agent, or Firm*—Leong C. Lei

(57) ABSTRACT

An electrical generator includes a rotary disk that is made of plastic injection molding in which a plurality of coils each having an exposed contact is embedded. Two stationary disks are arranged on opposite sides of the rotary disk and each has an inside surface that opposes the rotary disk and carries two semi-circular magnets. The rotary disk is fixed to a shaft having opposite ends fit into bearings that are received in central bores defined in the stationary disks. The coils are each formed by winding a wire in at least one turn in the form of a circle or an ellipse, the turns being coincident with each other or partially offset with respect to each other. Or alternatively, the coils are formed concentric with respect to each other and the rotary disk.

2 Claims, 3 Drawing Sheets

FLAT ELECTRICAL GENERATOR

BACKGROUND OF INVENTION (a) Technical Field of the Invention

The present invention relates to a flat electrical generator, and in particular to an electrical generator that comprises magnets and coils that are respectively mounted to stationary disks and a rotary disk, both made of plastics, and that rotates the rotary disk to cause interaction between the coils and magnetic fields generated by the magnets to induce electrical current thereby realizing generation of power. Alternatively, the coils may receive electrical power from an external source so that the present invention is practiced as an electrical motor.

(b) Description of the Prior Art

A conventional electrical generator comprises windings formed around a core and magnets fixed to a casing so that when the core is rotated, the windings intersect magnetic fields generated by the magnets to induce electrical currents therein. Due to the fact that the windings are formed around the core, the weight of the electrical generator is increased and the material used is increased. Both are against economic performance of the electrical generators. Further, the conventional power generators are often driven by belts, and the slackness of the belts becomes a factor that influences the rotation of the core, leading to undesired loading. In addition, the components of the conventional power generator are most made of iron based material, which may easily affect the magnetic fields generated by the magnets, preventing the magnetic fields from being concentrated and leading to poor performance. In addition, eccentricity may be induced after long time operation, leading to abrasion of the windings and thus breaking the circuit or poor performance and unstable operation. Further, the windings and the magnets are both enclosed in a cylindrical casing, leading to poor dissipation of heat and difficult of assembling. In addition, since the electrical current generated by the generator is, at least partly, determined by the gauge of the enameled wire that makes the windings, the overall size may be different, and this affects the productivity.

SUMMARY OF THE INVENTION

The primary purpose of the present invention is to provide a flat electrical generator, which comprises: a rotary disk, two stationary disks, coils, bearings, carbon brushes, and a shaft. Each coil is formed by winding a single wire at least one turn in the form of a circle or an ellipse, and the coils are positioned in a mold that is used to form the rotary disk by plastic injection molding so that the coils are embedded in the rotary disk. Each coil has an exposed contact point that is engageable with a corresponding conductor terminal to thereby form a complete winding set. The rotary disk is fixed to the shaft that extends through the rotary disk. The magnets are fixed to inside surfaces of the two plastic stationary disks. The stationary disks each form a central bore and a plurality of carbon brush holes distributed along a circumference of the central bore for receiving and retaining the carbon brushes. The shaft that is fixed to the rotary disk has opposite ends projecting beyond opposite faces of the rotary disk and respectively fit the bearings of the stationary disks to thereby constitute a basic configuration of an electrical generator, which is operated by having the rotary disk that contains the coils rotated to cause interaction between the coils and the magnetic fields of the magnet and thus inducing electrical current in the coils, which current is conducted out by the carbon brushes to thereby realize the function of a power generator. Alternatively and reversely, electrical power can be supplied into the coils to convert the device into an electrical motor.

The magnets that are used in the power generator in accordance with the present invention are planar magnets and in operation, magnetic zones are fixed at the same locations. In addition, the gaps for the magnets on opposite sides are fixed, so that the effectiveness of the magnetic fields can enhanced to provide enhanced power generation as compared to the conventional devices.

In accordance with the present invention, the magnetic fields are induced in the gaps between the magnets of the two sides and the coils so that there is almost no abrasion or wear. Further, since the magnets are fixed on the opposite sides, electrical power is generated at the same area in an evenly distributed manner, so that there will no power loss during the operation of the power generator and further the power generated can be enhanced. In addition, the flat generator of the present invention can be combined with other identical devices to form a combined, multi-unit device that increase the power generated. This structure has never been suggested and features no frictional loading, enhanced and stable generation of power, being less weight and easy to maintain.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
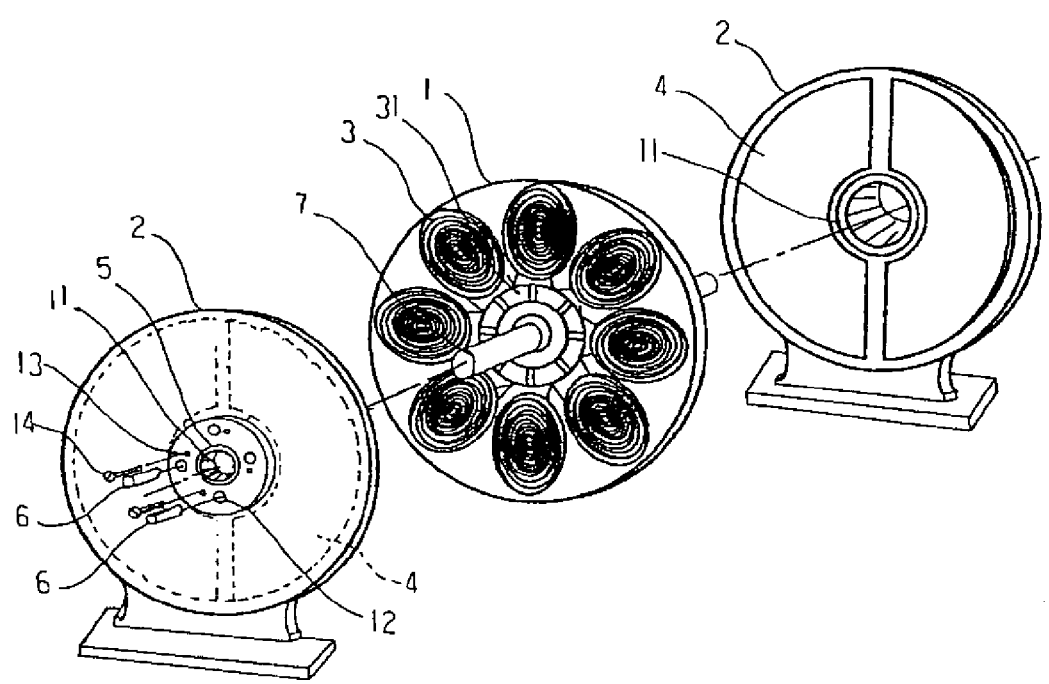
FIG. 1 is an exploded view of a flat electrical generator constructed in accordance with the present invention.
Figure 2:
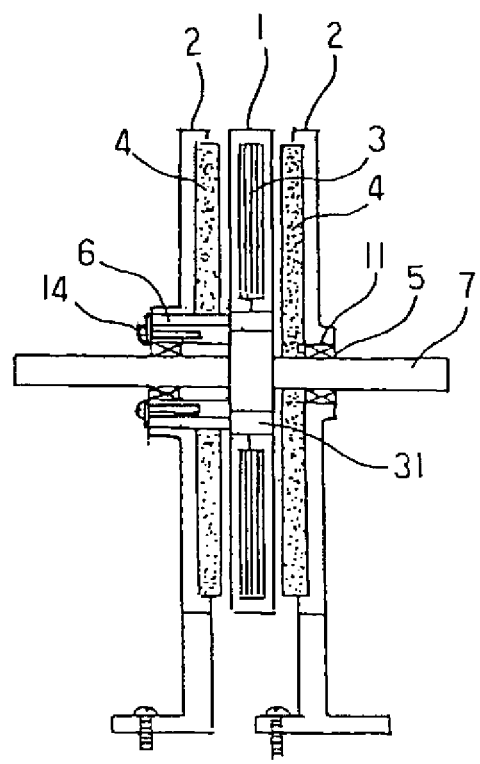
FIG. 2 is a cross-sectional view of the flat electrical generator in accordance with the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

With reference to the drawings and in particular to FIGS. 1-5, a flat generator constructed in accordance with the present invention comprises a rotary disk 1, two stationary disks 2, a plurality of coil sets 3, a plurality of magnets 4, bearings 5, carbon brushes 6, and a shaft 7.

Figure 3:
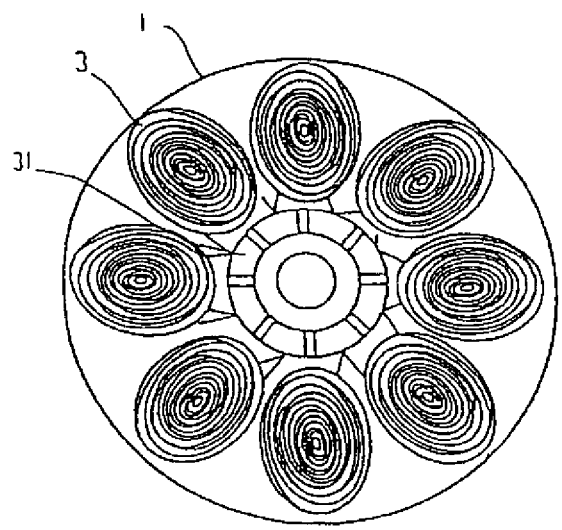
FIG. 3 is a plain view of the arrangement of coils in accordance with a first embodiment of the present invention.

The coil sets 3 are formed by winding wires in a way that is different from the conventional generators in which the coils or windings are wound around an iron core. In a first embodiment of the present invention, as shown in FIGS. 1 and 3, each coil 3 is formed by a single wire that is wound as plural circular or elliptic turns that are substantially concentric or coincident with each other. The coils 3 that are so formed are then deposited in a mold that is used to form the rotary disk 1, followed by plastic injection molding, so that the coils 3 are completely embedded in the rotary disk 1 that is formed by the injection molding. Each coil 3 has an exposed contact point (not labeled) that is put in physical engagement with a corresponding conductor terminal 31. The rotary disk 1 is fixed to the shaft 7 that extends through the rotary disk 1 so that opposite ends of the shaft 7 project beyond opposite faces of the rotary disk 1.

Figure 4:
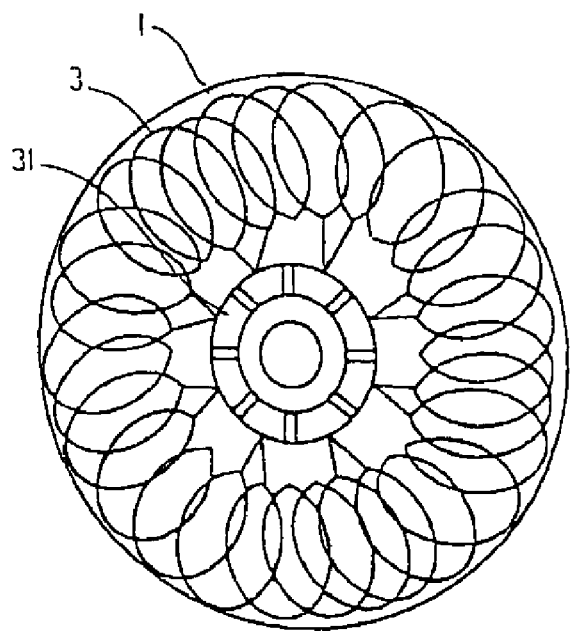
FIG. 4 is a plain view of the arrangement of coils in accordance with a second embodiment of the present invention.

In accordance with a second embodiment of the present invention, as shown in FIG. 4, each coil 3 is formed by continuously winding a wire to form a plurality of turns that are at least partially offset with respect to each other.

Figure 5:
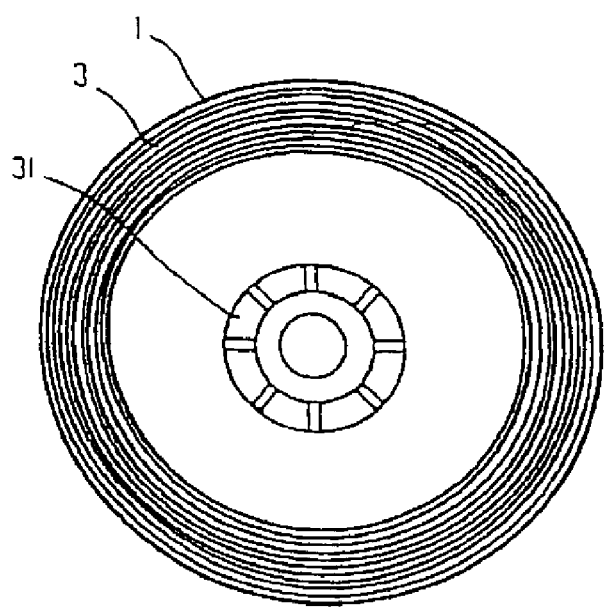
FIG. 5 is a plain view of the arrangement of coils in accordance with a third embodiment of the present invention.

In accordance with a third embodiment of the present invention, as shown in FIG. 5, the coils 3 are formed by winding wires in a concentric manner with respect to each other. In the embodiment illustrated in FIG. 5, four coil sets 3 are provided, which are concentric to each other.

The coils 3 of all the embodiments are combined with the plastics that make the rotary disk so that the material for forming the coils is reduced as compared to the conventionally core-wound coil sets. Thus, saving of cost can be achieved.

In a preferred embodiment, the magnets 4 are made semi-circular and two semi-circular magnets 4 form a group that is fixed to an inside face of each stationary disk 2 that is made of plastics. The stationary disk 2 forms a central bore 11 and the bearing 5 is received and fixed in the bore 11. A plurality of carbon brush holes 12 and a plurality of bolt receiving holes 13 are defined in the inside face of the stationary disk 2 and are respectively distributed along a circumference of the bore 11. The carbon brushes 6 are each received in the carbon brush holes 12 and are kept from falling out of the stationary disk 2 by retention bolts 14 received in the bolt receiving holes 13.

The rotary disk 1 is coupled to the stationary disks 2 by means of the portions of the shaft 7 that project beyond the opposite faces thereof and fit into the bearings 5 fixed in the bores 11 of the stationary disks 2, whereby the rotary disk 1 is positioned between the stationary disks 2 to form a basic configuration of the electrical generator.

The electrical generator is operated in the way that the rotary disk 1 that carries the coils 3 is rotated to have the coils 3 interacting with the magnetic fields of the magnets 4 that are fixed on the stationary disks 2 to induce electrical current therein. The current is transmitted through the conductors 31 and the carbon brushes so as to realize the generation of electricity.

The feature of the flat electrical generator in accordance with the present invention is that, in the generation of electrical power, the magnets are kept fixed while the coils are put in rotation. As an alternative to the structure of the electrical generator of the present invention, the coils can be kept fixed, while the magnets are put in rotation in order to generate electrical power; and in this way, no carbon brush is needed with the electrical power induced in the coils by the magnetic fields of the rotating magnets directly transmitted outward.

Further, the flat electrical generator in accordance with the present invention can be used as an electrical motor by supplying electrical current to the coils and such a motor can serve as a flat motor that provides high torque and high rotation speed and can be used as for example a fan motor or other driving motors.

In practicing the present invention as an electrical motor, the power supply can be a single source or a dual source power supply, and this is determined on the basis of the size of the motor. In practicing the present invention as a power generator, the generator of the present invention can be used as a stand-alone power generator, or can be combined with other identical power generator in a series connection or parallel connection. This can realize the desired amount of electrical power and performance with reduced weight and volume.

In the generator of the present invention, the magnets induce magnetic fields in the gaps between the magnets on the two sides and the coils so that friction and abrasion caused therebetween can be substantially eliminated. This, together with the fact that the enameled wires that make the coils are embedded in the plastics that make the rotary disk, maintains the performance of the magnetic fields without undesired influence by any external factors and can effectively concentrate the magnetic field. In addition, when eccentricity occurs in the shaft or the bearings, wear of the enameled wires will not happen.

In accordance with the present invention, the coils of the electrical generator are embedded in the plastic rotary disk and no winding around an iron core is needed. The magnets are fixed to the two plastic stationary disks. All these effect the result of reduction of weight, reduction of loading, reduction of material of the coils, ease of installation, and no wearing and no dissipation problem. The electrical power generated is enhanced and stable without any friction loading and the device is lightweight, easy to maintain and, besides being converted into an electrical motor, can be used in various applications, including:

(1) Wind power generation, in which airflows caused by winds are used to drive rotation of vanes of a windmill, which rotation is transmitted through a transmission to the electrical generator of the present invention, which is in generally made of plastics and is thus of less and is lightweight and is not influenced by external factors or does not attract other ferrite articles, leading to negative effect to the power generation, and consequently, the wind power generation can be of the maximum power generation with the minimum operation;

(2) Hydroelectric power generation, which uses the flushing power of water flow to drive the electrical generator of the present invention for the generation of electrical power, and due to the fact that water power is generally greater tan wind power, the hydroelectric power generation can more easily provide desired power generation, which together with the lightweight structure of the present invention and having less resistance, can provide more enhanced power generation than the conventional power generator;

(3) Power generation by being driven by a small motor, wherein a small motor is used to drive the electrical generator of the present invention, whereby since the operation of the small motor consumes less electrical power than that generated by the electrical generator of the present invention, the electrical generator of the present invention can provide large amount of electrical power by being operated with small amount of electrical power so as to suit the needs of requirement of small amount of electrical power; and (4) Thermal electrical power generation, wherein since the electrical generator of the present invention features small load and light weight and has a lightweight structure and less resistance, the electrical generator, when applied to thermal electrical power generation, is more effectively is realizing the desired generation of power than the conventional electrical generator can.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A flat electrical generator comprising:
   a shaft;
   a rotary disk fixedly mounted on said shaft;
   a first stationary disk made of plastic and having a central bore in which is fitted a bearing, a plurality of brush holes and bolt receiving holes defined in an inside face of said first stationary disk and distributed along a circumference of said central bore;
   a second stationary disk made of plastic having a central bore in which is fitted a bearing;
   said rotary disk being coupled to said first and second stationary disks by means of portions of said shaft that project beyond opposite faces of said stationary disks and fit into said bearings fixed in said bores of said stationary disks, thereby positioning said rotary disk between said stationary disks;
   a plurality of carbon brushes each received in a respective one of said carbon brush holes of said first stationary disk and kept from falling out of said stationary disk by retention bolts received in a respective one of said bolt receiving holes;
   a plurality of coil sets each formed by continuously winding a wire to form a plurality of turns that are at least partially offset with respect to each other, said coil sets being completely embedded in said rotary disk;
   two first semi-circular magnets fixed to an inside face of said first stationary disk; and
   two second semi-circular magnets fixed to an inside face of said second stationary disk.

2. The flat electrical generator as claimed in claim 1, wherein each of said coil sets has an exposed contact point that is put in physical engagement with a conductor terminal.

* * * * *